United States Patent
Kurihara

(10) Patent No.: US 8,437,033 B2
(45) Date of Patent: May 7, 2013

(54) OPTICAL SCANNING DEVICE AND IMAGE FORMING APPARATUS EQUIPPED WITH THE SAME

(75) Inventor: Takayuki Kurihara, Osaka (JP)

(73) Assignee: Kyocera Mita Corporation (JP)

( * ) Notice: Subject to any disclaimer, the term of this patent is extended or adjusted under 35 U.S.C. 154(b) by 1345 days.

(21) Appl. No.: 11/655,525

(22) Filed: Jan. 19, 2007

(65) Prior Publication Data

US 2007/0171272 A1   Jul. 26, 2007

(30) Foreign Application Priority Data

Jan. 24, 2006   (JP) ................. 2006-014766

(51) Int. Cl.
*G06K 15/22* (2006.01)
*B41J 15/14* (2006.01)

(52) U.S. Cl.
USPC ............ 358/1.4; 347/224; 347/238; 347/243; 347/259; 347/260

(58) Field of Classification Search ................... 358/1.4; 347/224, 238, 243, 259, 260
See application file for complete search history.

(56) References Cited

U.S. PATENT DOCUMENTS

| | | | |
|---|---|---|---|
| 6,304,360 B1 | 10/2001 | Sekikawa | |
| 6,747,766 B1 | 6/2004 | Kamisuwa et al. | |
| 7,254,359 B2 | 8/2007 | Iwakura et al. | |
| 2002/0113856 A1* | 8/2002 | Suzuki | 347/133 |
| 2004/0161192 A1* | 8/2004 | Hamano et al. | 385/31 |
| 2005/0185991 A1 | 8/2005 | Iwakura et al. | |
| 2005/0219672 A1 | 10/2005 | Fujita et al. | |
| 2007/0058221 A1* | 3/2007 | Heink et al. | 358/504 |

FOREIGN PATENT DOCUMENTS

| | | |
|---|---|---|
| CN | 1658081 A | 8/2005 |
| JP | 2000-180750 | 6/2000 |
| JP | 2005-288825 | 10/2005 |
| JP | 2006-337391 | 12/2006 |

* cited by examiner

*Primary Examiner* — Charlotte M Baker
(74) *Attorney, Agent, or Firm* — Gerald E. Hespos; Michael J. Porco; Matthew T. Hespos

(57) ABSTRACT

An optical scanning device is configured in such a manner that, of four light beams for colors corresponding to cyan, magenta, yellow, and black, the number of folding mirrors disposed in the optical path of a light beam corresponding to an mage in yellow having the highest brightness and the lowest visibility is the greatest number, and further, the number of the folding mirrors disposed in the optical path of a light beam corresponding to an image in black having the lowest brightness and the highest visibility is the least number. It is thus possible to reduce unevenness in color in the color image resulting from the folding of light beams by the folding mirrors.

9 Claims, 2 Drawing Sheets

OPTICAL SCANNING DEVICE AND IMAGE FORMING APPARATUS EQUIPPED WITH THE SAME

BACKGROUND OF THE INVENTION

1. Field of the Invention

The present invention relates to an optical scanning device that scans light beams to write and form an image for use in an image forming apparatus, such as a printer, a facsimile machine, and a copying machine, and more particularly, to an optical scanning device suitably used in a color image forming apparatus, such as a color laser printer and a digital color copying machine, and an image forming apparatus equipped with the same.

2. Description of the Related Art

An image forming apparatus in the related art using the electrophotographic method, such as a copying machine and a printer, is equipped with an optical scanning device that scans a light beam modulated according to input image data on the surface of a photoconductive drum charged uniformly by the charger. An image is formed by developing an electrostatic latent image formed by the optical scanning device into a toner image by the developing device, and then transferring the toner image onto a recording sheet of paper or the like.

Incidentally, as a color image forming apparatus is becoming faster, a digital copying machine or a laser printer adopting a method (so-called 4-drum tandem method) is now put into practical use, in which, for example, four photoconductive drums are aligned in the transportation direction of recording sheets of paper to form electrostatic latent images by exposing the photoconductive drums to light simultaneously using plural optical scanning devices corresponding to the respective photoconductive drums, and after these electrostatic latent images are developed into toner images by the developing devices that use developing agents in different colors, such as yellow, magenta, cyan, and black, these toner images are transferred onto the same recording sheet of paper successively so as to be superimposed one on another for a color image to be obtained.

According to the 4-drum tandem method, because an image can be outputted at the same speed in either color printing or monochromatic printing, it is advantageous when fast printing is desired. However, because four optical scanning devices are provided correspondingly to four photoconductive drums to expose the drums, the apparatus tends to increase in size. Meanwhile, to meet the need for a compact image forming apparatus in recent years, there has been proposed an optical scanning device that is made compact by configuring in such a manner that plural light beams emitted from the light sources provided separately for respective colors are deflected by a single deflector, so that the light beams are guided to different photoconductors to expose and scan the corresponding photoconductors (for example, see JP-A-2000-180750).

The optical scanning device of a type proposed in JP-A-2000-180750 is configured in such a manner that light beams go incident on the deflector at different angles in the sub-scanning direction for making it easier to separate optical paths of plural deflected light beams. This gives rise to bows (a phenomenon that scanning lines of light beams deflected by the defector are curved) of different quantities in the respective light beams deflected by the deflector. Because the quantities of the bows vary among the respective light beams, a color shift occurs in the resulting color image.

Such being the case, JP-A-2005-288825 proposes an optical scanning device that makes a color shift or an image curve in the color image caused by bows occurring in the light beams hardly noticeable by setting, of plural light beams corresponding to developing agents in different colors, a smaller angle of incidence on the deflector for light beams corresponding to developing agents having high visibility, that is, low brightness while setting a larger angle of incidence on the deflector for light beams corresponding to developing agents having low visibility, that is, high brightness.

For the optical scanning device of a type proposed in JP-A-2005-288825, it is, however, necessary to dispose plural folding mirrors as reflection members inside the optical scanning device to guide light beams to the corresponding photoconductors. The reflectance of the folding mirror has a dependency on the angle of incidence, and there is a difference in intensity between the center portion and the end portion of an image height of the reflected light beam. Hence, a difference in light beam intensity between the center portion and the end portion of the image height becomes larger as the number of folding times increases. This makes it difficult to form a color image having no unevenness in color.

SUMMARY OF THE INVENTION

An advantage of the invention is to provide an optical scanning device configured to reduce unevenness in color in a color image resulting from the folding of light beams and an image forming apparatus equipped with the same.

An optical scanning device according to one aspect of the invention includes: plural light sources that emit light beams corresponding to images using developing agents each having different brightness; a deflector that deflects plural light beams emitted from the plural light sources as the plural light beams go incident on a same reflection surface thereof at different angles of incidence in a sub-scanning direction; and plural reflection members that reflect the plural light beams deflected by the deflector to be distributed to surfaces of different photoconductors, wherein, of light paths of the plural light beams, a greatest number of the reflection members are disposed in a light path of a light beam corresponding to an image using a developing agent having highest brightness.

In this optical scanning device, by configuring in such a manner that the number of folding times in the optical path of a light beam corresponding to an image using the developing agent having the highest brightness is the greatest number, a difference in light beam intensity between the center portion and the end portion of the image height becomes largest for a light beam having the greatest number of folding times, which makes the unevenness in color occurring in the formed image most significant. However, because an image using the developing agent having the highest brightness has the lowest visibility, the unevenness in color in the color image becomes hardly noticeable. It is thus possible to reduce the unevenness in color in the color image resulting from the folding of the light beams by the reflection members.

DETAILED DESCRIPTION OF THE PREFERRED EMBODIMENTS

Figure 1:
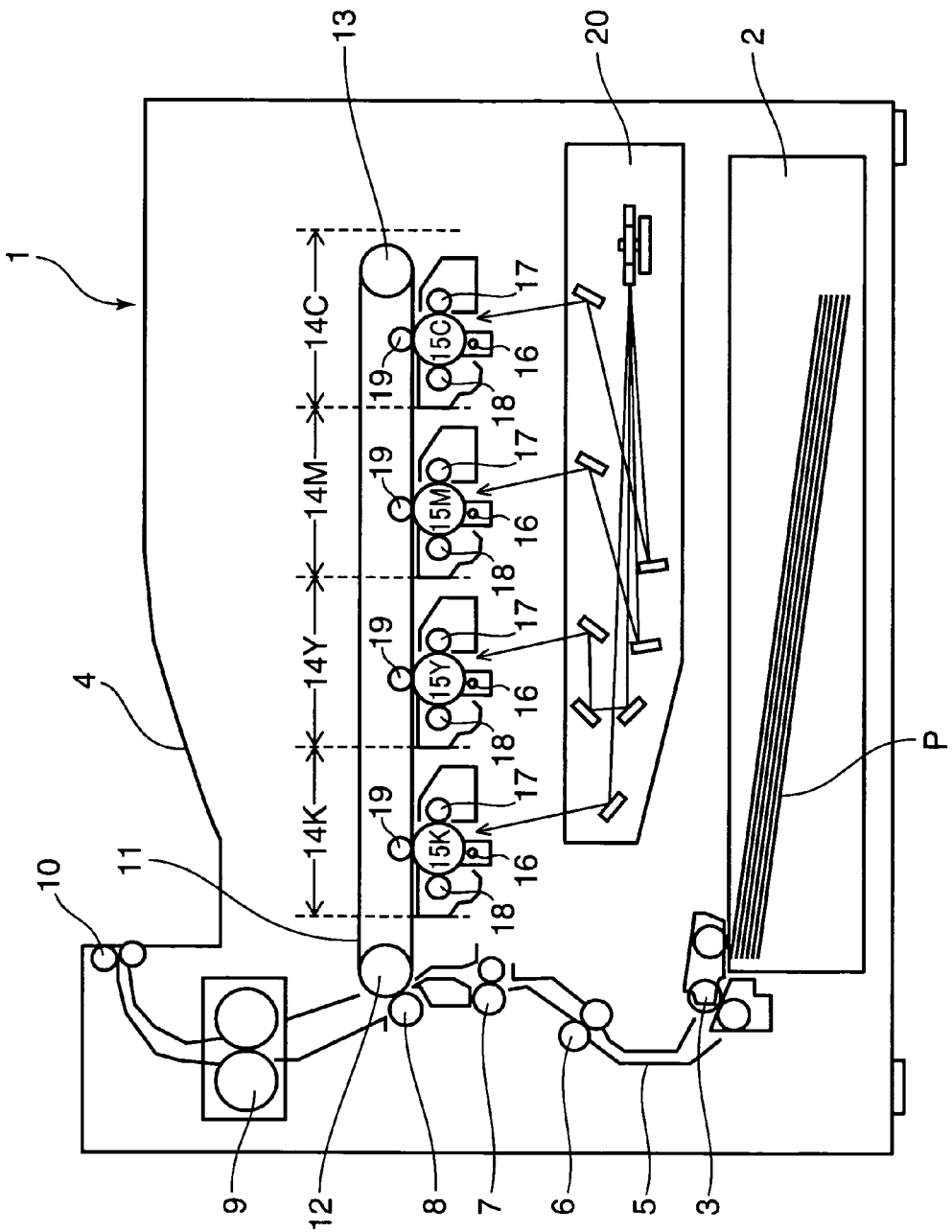
FIG. 1 is a view schematically showing the configuration of an image forming apparatus equipped with an optical scanning device according to one embodiment of the invention.

Hereinafter, an image forming apparatus equipped with an optical scanning device according to one embodiment of the invention will be described with reference to the drawings. FIG. 1 is a view schematically showing the configuration of the image forming apparatus equipped with the optical scanning device according to one embodiment of the invention, and a 4-drum tandem type color image forming apparatus is shown therein.

A paper feeding portion 2, such as a paper feeding cassette, to store a pile of sheets of paper is provided at the lower portion of the color image forming apparatus 1. A separator feeding member 3 to feed sheets of paper P one by one from the top of the pile is provided at one end portion of the paper feeding portion 2. A paper transportation path 5 extending upward to reach a discharge tray 4 formed on the top surface of the main body is defined above the separator feeding member 3. The separator feeding member 3, a pair of transportation rollers 6, a pair of register rollers 7, a transfer roller 8, a pair of fixing rollers 9, and a pair of paper discharging rollers 10 are disposed sequentially along the paper transportation path 5 from upstream in the paper transportation direction.

An intermediate transfer belt 11 is provided in a rotatable manner at the right of the transfer roller 8. The intermediate transfer belt 11 is stretched over a drive roller 12 and a driven roller 13, and it rotates in a clockwise direction in association with rotational driving by the drive roller 12. The drive roller 12 abuts on the transfer roller 8 via the intermediate transfer belt 11. A sheet of dielectric resin is used for the intermediate transfer belt 11, and a belt formed in an endless shape by overlapping and joining the both end portions or a seamless belt is suitably used.

Below the intermediate transfer belt 11 are sequentially provided four image forming portions 14C, 14M, 14Y, and 14K along the rotational direction, in other words, from right to left in FIG. 1, that is, along a direction in which the intermediate transfer belt 11 moves (sub-scanning direction). These image forming portions 14C through 14K are provided correspondingly to images in four different colors (cyan, magenta, yellow, and black), and respectively form images in cyan, magenta, yellow, and black in series in the charging, exposing, developing, and transferring steps.

The image forming portions 14C through 14K are provided, respectively, with photoconductive drums 15C, 15M, 15Y, and 15K that carry visible images (toner images) in the corresponding colors. On the periphery of the photoconductive drums 15C through 15K provided in a rotatable manner are disposed chargers 16 that charge the corresponding photoconductive drums 15C through 15K, developing units 17 that form toner images on the corresponding photoconductive drums 15C through 15K, cleaning portions 18 that remove developing agents remaining on the corresponding photoconductive drums 15C through 15K, and intermediate transfer rollers 19 that abut on the corresponding photoconductive drums 15C through 15K via the intermediate transfer belt 11. Further, an optical scanning device 20 is provided below the photoconductive drums 15C through 15K to expose the respective photoconductive drums 15C through 15K to light according to image information.

An image forming operation by the color image forming apparatus 1 configured as above will now be described. When the user inputs an instruction to start the image formation, the respective photoconductive drums 15C through 15K are rotationally driven first, so that the surfaces of the respective photoconductive drums 15C through 15K are charged uniformly by the corresponding chargers 16. Subsequently, light beams are irradiated to the respective photoconductive drums 15C through 15K by the optical scanning device 20 while being scanned in the main scanning direction (a direction orthogonal to the sheet surface of FIG. 1) according to input image signals, so that electrostatic latent images according to the image signals are formed on the respective photoconductive drums 15C through 15K.

Developing agents in respective colors including cyan, magenta, yellow, and black filled in the corresponding developing units 17 from unillustrated replenishing devices are supplied to the respective photoconductive drums 15C through 15K, and toner images according to the electrostatic latent images are formed. After an electric field is conferred to the intermediate transfer belt 11 at a specific transfer voltage, the toner images in cyan, magenta, yellow, and black on the photoconductive drums 15C through 15K, respectively, are transferred onto the intermediate transfer belt 11 by the corresponding intermediate transfer rollers 19.

These images in four colors are formed in a specific positional relation pre-determined for specific full-color image formation. Subsequently, the developing agents remaining on the surfaces of the photoconductive drums 15C through 15K are removed by the corresponding cleaning portions 18 to prepare for new electrostatic latent images that will be formed next continuously.

Meanwhile, when the intermediate transfer belt 11 starts to rotate in a clockwise direction in association with the rotations of the drive roller 12 by a driving motor (not shown), a sheet of paper P is transported from the pair of register rollers 7 to the transfer roller 8 provided adjacently to the intermediate transfer belt 11 at specific timing, and a full-color image is transferred on the sheet of paper P. The sheet of paper P on which are transferred the toner images is transported to the pair of fixing rollers 9. Heat and a pressure are applied to the sheet of paper P by the pair of fixing rollers 9 for the toner images to be transferred on the surface thereof. A specific full-color image is thus formed. The sheet of paper P on which is formed the full-color image is then discharged onto the discharge tray 4 by the pair of discharging rollers 10.

Figure 2:
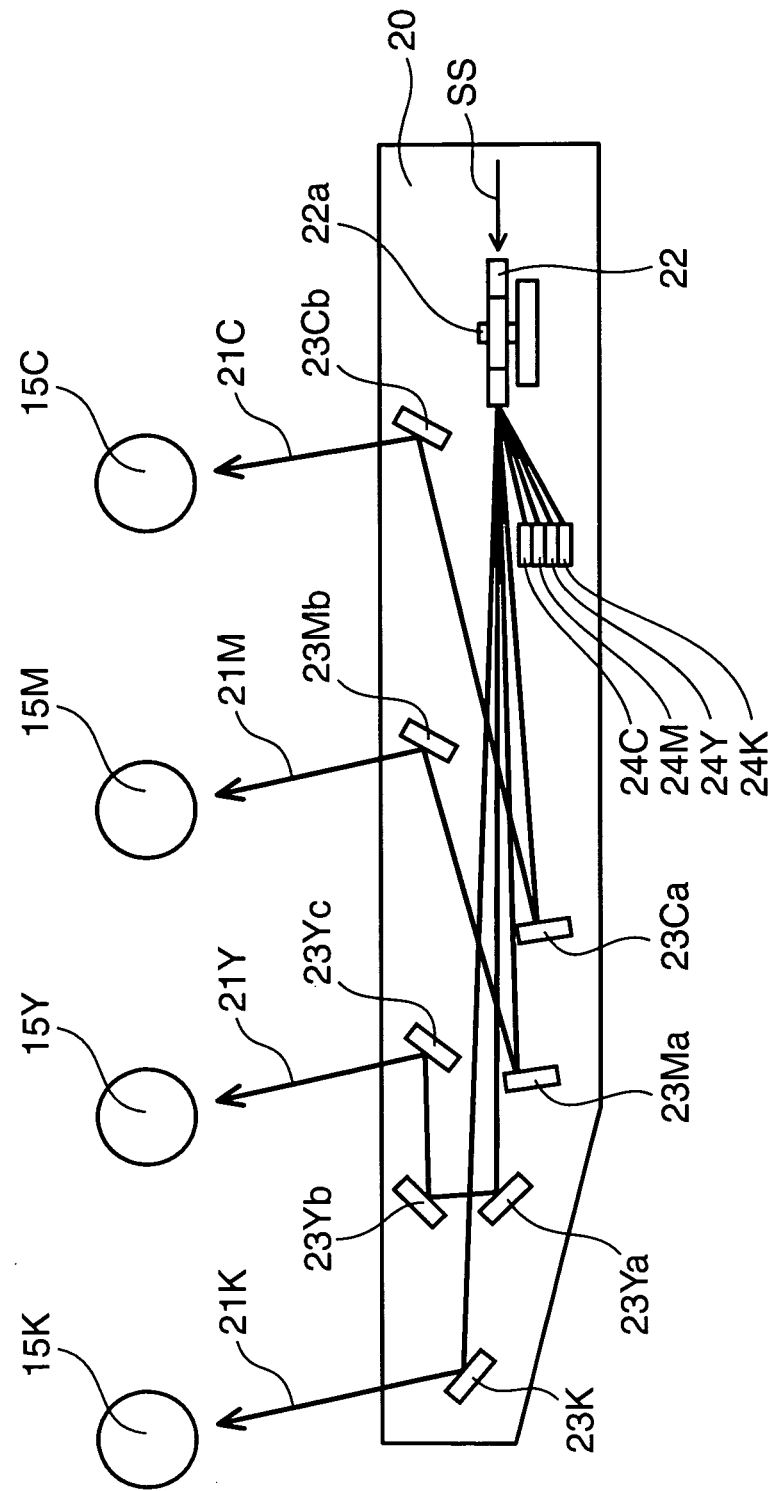
FIG. 2 is a view schematically showing the configuration of the optical scanning device shown in FIG. 1.

Referring to FIG. 2, the optical scanning device 20 will be described further. FIG. 2 is a view schematically showing the configuration of the optical scanning device 20 shown in FIG. 1, and only the photoconductive drums 15C through 15K provided, respectively, to the image forming portions 14C through 14K are shown for ease of description. The optical scanning device 20 includes four light sources 24C through 24K that emit light beams 21C through 21K modulated according to image signals, a polygon mirror 22, and plural folding mirrors 23Ca, 23Cb, 23Ma, 23Mb, 23Ya through 23Yc, and 23K. In FIG. 2, the locations of the four light sources 24C through 24K are shown schematically for ease of illustration, and it should be appreciated that they may be disposed at places dispersed appropriately in a horizontal direction when the need arises. Also, the locations of the four light sources 24C through 24K are not limited especially to the above described example and are determined as appropriate according to the locations of the folding mirrors and the polygon mirror.

The four light sources 24C through 24K respectively emit light beams 21C, 21M, 21Y, and 21K modulated according to image signals for cyan, magenta, yellow, and black, and these four light beams 21C through 21K go incident on the reflection surface of the polygon mirror 22. In this instance, in order to make it easier to separate the optical paths of the four light beams 21C through 21K deflected by the polygon mirror 22, it is configured in such a manner that the four light beams 21C through 21K go incident on the same reflection surface of the polygon mirror 22 at different angles in the sub-scanning direction SS.

The polygon mirror 22 serving as a deflector of light beams is provided inside the optical scanning device 20 in a rotatable manner, and deflects the four light beams 21C through 21K that come incident on the reflection surface thereof at an equiangular velocity by rotating about the rotational axis 22a. The deflected four light beams 21C through 21K are independently folded one or more than one time by the corresponding folding mirrors 23Ca, 23Cb, 23Ma, 23Mb, and 23Ya through 23Yc, and 23K, which are reflection members disposed on the corresponding optical paths, and distributed to the surfaces of the corresponding photoconductive drums 15C, 15M, 15Y, and 15K.

For reasons of the settings of the optical paths and layout, the numbers of the folding mirrors 23Ca, 23Cb, 23Ma, 23Mb, 23Ya through 23Yc, and 23K disposed in the corresponding optical paths of the light beams 21C through 21K vary among the respective optical paths. The optical scanning device 20 of this embodiment is configured in such a manner that, as is shown in FIG. 2, of the four light beams 21C through 21K in colors corresponding to cyan, magenta, yellow, and black, respectively, three folding mirrors 23Ya through 23Yc, that is, the greatest number of the folding mirrors, are disposed in the optical path of the light beam 21Y corresponding to an image in yellow having the highest brightness and the lowest visibility.

More specifically, the folding mirror 23Ya reflects the light beam 21Y deflected in the main scanning direction by the polygon mirror 22, and the folding mirror 23Yb reflects the light beam 21Y reflected on the folding mirror 23Ya. The folding mirror 23Yc reflects the light beam 21Y reflected on the folding mirror 23Yb to be guided to the surface of the photoconductive drum 15Y for the light beam 21Y to scan the photoconductive drum 15Y.

By configuring in this manner, a light beam having the greatest number of folding times has the largest difference in light beam intensity between the center portion and the end portion of the image height, which makes the unevenness in color occurring in the formed image most significant. However, by determining such a light beam as the light beam 21Y corresponding to an image in yellow having low visibility, the unevenness in color in the color image becomes hardly noticeable.

Meanwhile, the folding mirror 23Ca reflects the light beam 21C deflected in the main scanning direction by the polygon mirror 22 and the folding mirror 23Cb reflects the light beam 21C reflected on the folding mirror 23Ca to be guided to the surface of the photoconductive drum 15C for the light beam 21C to scan the photoconductive drum 15C. The folding mirror 23Ma reflects the light beam 21M deflected in the main scanning direction by the polygon mirror 22, and the folding mirror 23Mb reflects the light beam 21M reflected on the folding mirror 23Ma to be guided to the surface of the photoconductive drum 15M for the light beam 21M to scan the photoconductive drum 15M.

Further, as is shown in FIG. 2, the optical scanning device 20 of this embodiment is configured in such a manner that, of the four light beams 21C through 21K for colors corresponding, respectively, to cyan, magenta, yellow, and black, one folding mirror 23K, that is, the least number of the folding mirrors, is disposed in the optical path of the light beam 21K corresponding to an image in black having the lowest brightness and the highest visibility.

More specifically, the folding mirror 23K reflects the light beam 21K deflected in the main scanning direction by the polygon mirror 22 to be guided to the surface of the photoconductive drum 15K for the light beam 21K to scan the photoconductive drum 15K.

By configuring in this manner, the number of folding times of the light beam 21K corresponding to an image in black having high visibility becomes the least number, and a difference in light beam intensity between the center portion and the end portion of the image height becomes smallest, which makes the unevenness in color in the formed image least significant. The unevenness in color in the color image therefore becomes hardly noticeable.

It should be appreciated that the invention is not limited to the embodiment above, and the invention can be modified in various manners without deviating from the scope of the invention. For example, the embodiment above has described the image forming apparatus using the intermediate transfer belt. However, the invention is also applicable to an image forming apparatus that performs color image formation by carrying a sheet of paper on the transfer belt and transferring images formed on plural photoconductive drums directly onto the sheet of paper so as to be superimposed one on another. Also, the embodiment above has described the image forming apparatus using developing agents in four colors including yellow, magenta, cyan, and black to obtain a full-color image. However, the invention is also applicable to an image forming apparatus provided with color materials of different hues or an image forming apparatus having a different number of colors.

The embodiment above has described only the optical scanning device 20 equipped with a single polygon mirror 22. However, the invention can be also applied in the same manner to an optical scanning device equipped with two polygon mirrors inside the device and configured to deflect light beams 21C and 21M for cyan and magenta, respectively, by one of the polygon mirrors and deflect the light beams 21Y and 21K for yellow and black, respectively, by the other polygon mirror.

The invention can be used for an optical scanning device that scans light beams to write and form an image and equipped to an image forming apparatus, such as a printer, a facsimile machine, and a copying machine. In particular, the invention can be used suitably to an optical scanning device equipped to a color image forming apparatus, such as a color laser printer and a digital color copying machine.

As has been described, an optical scanning device according to one aspect of the invention includes: plural light sources that emit light beams corresponding to images using developing agents each having different brightness; a deflector that deflects plural light beams emitted from the plural light sources as the plural light beams go incident on a same reflection surface thereof at different angles of incidence in a sub-scanning direction; and plural reflection members that reflect the plural light beams deflected by the deflector to be distributed to surfaces of different photoconductors, wherein, of light paths of the plural light beams, a greatest number of the reflection members are disposed in a light path of a light beam corresponding to an image using a developing agent having highest brightness.

According to the configuration described above, by configuring in such a manner that the number of folding times in the optical path of a light beam corresponding to an image using the developing agent having the highest brightness is the greatest number, a difference in light beam intensity between the center portion and the end portion of the image height becomes largest for a light beam having the greatest number of folding times, which makes the unevenness in color occurring in the formed image most significant. However, because an image using the developing agent having the highest brightness has the lowest visibility, the unevenness in color in the color image becomes hardly noticeable. It is thus possible to reduce the unevenness in color in the color image resulting from the folding of the light beams.

It is preferable that, of the light paths of the plural light beams, a least number of the reflection members are disposed in an optical path of a light beam corresponding to an image using a developing agent having lowest brightness.

In this case, by configuring in such a manner that the number of folding times in the optical path of a light beam corresponding to an image using the developing agent having the lowest brightness is the least number, a difference in light beam intensity between the center portion and the end portion of the image height becomes smallest for a light beam having the least number of folding times, which makes the unevenness in color occurring in the formed image least significant. Because the unevenness in color of an image using the developing agent having the lowest brightness, that is, the highest visibility can be least significant in this manner, the unevenness in color in the color image becomes hardly noticeable. It is thus possible to further reduce the unevenness in color in the color image resulting from the folding of the light beams.

It is preferable that the plural light sources include: a first light source that emits a first light beam corresponding to an image using a cyan developing agent; a second light source that emits a second light beam corresponding to an image using a magenta developing agent; a third light source that emits a third light beam corresponding to an image using a yellow developing agent; and a fourth light source that emits a fourth light beam corresponding to an image using a black developing agent, and that the number of the reflection members that reflect the third light beam deflected by the deflector is greater than the numbers of the reflection members that reflect the first, second, and fourth light beams deflected by the deflector.

In this case, by configuring in such a manner that the number of folding times in an optical path of a light beam corresponding to an image using the yellow developing agent having the highest brightness is the greatest number, a difference in light beam intensity between the center portion and the end portion of the image height of the light beam for yellow becomes largest, which makes the unevenness in color occurring in the formed image most significant. However, because the image using the yellow developing agent having the highest brightness has the lowest visibility, the unevenness in color in the color image becomes hardly noticeable.

It is preferable that the number of the reflection members that reflect the fourth light beam deflected by the deflector is smaller than the numbers of the reflection members that reflect the first through third light beams deflected by the deflector.

In this case, by configuring in such a manner that the number of folding times in the optical path of a light beam corresponding to an image using the black developing agent having the lowest brightness is the least number, a difference in light beam intensity between the center portion and the end portion of the image height of a light beam for black becomes smallest, which makes the unevenness in color in an image using the black developing agent having the lowest brightness, that is, the highest visibility least significant. The unevenness in color in the color image therefore becomes hardly noticeable.

It is preferable that the plural reflection members include: a first reflection member that reflects the first light beam deflected by the deflector; a second reflection member that guides the first light beam reflected on the first reflection member to a surface of a photoconductor for cyan; a third reflection member that reflects the second light beam deflected by the deflector; a fourth reflection member that guides the second light beam reflected on the third reflection member to a surface of a photoconductor for magenta; a fifth reflection member that reflects the third light beam deflected by the deflector; a sixth reflection member that reflects the third light beam reflected on the fifth reflection member; a seventh reflection member that guides the third light beam reflected on the sixth reflection member to a surface of a photoconductor for yellow; and an eighth reflection member that guides the fourth light beam deflected by the deflector to a surface of a photoconductor for black.

In this case, two reflection members are provided for cyan, two reflection members for magenta, three reflection members for yellow, and one reflection member for black. It is thus possible to set the greatest number to the number of the reflection members for yellow having the highest brightness and the lowest visibility, and the least number to the number of the reflection members for black having the lowest brightness and the highest visibility, which can in turn reduce sufficiently the unevenness in color in the color image resulting from the folding of the light beams.

It is preferable that the second, fourth, seventh, and eighth reflection members are disposed sequentially along the sub-scanning direction.

In this case, not only is it possible to dispose the reflection member for black in the least number adjacently to the reflection members for yellow in the greatest number, but it is also possible to dispose the deflector adjacently to the reflection members for cyan and magenta in the middle number. Hence, it becomes easier to set the respective optical paths and dispose the respective members. The optical scanning device can be consequently reduced both in size and thickness.

An optical scanning device according to another aspect of the invention includes: plural light sources that emit light beams corresponding to images using developing agents each having different brightness; a deflector that deflects plural light beams emitted from the plural light sources as the plural light beams go incident on a same reflection surface thereof at different angles of incidence in a sub-scanning direction; and plural reflection members that reflect the plural light beams deflected by the deflector to be distributed to surfaces of different photoconductors, wherein, of light paths of the plural light beams, a least number of the reflection members are disposed in a light path of a light beam corresponding to an image using a developing agent having lowest brightness.

According to the configuration described above, by configuring in such a manner that the number of folding times in the optical path of a light beam corresponding to an image using the developing agent having the lowest brightness is the least number, a difference in light beam intensity between the center portion and the end portion of the image height becomes smallest for a light beam having the least number of folding times, which makes the unevenness in color occurring in the formed image least significant. Because the unevenness in color in an image using the developing agent having the lowest brightness, that is, the highest visibility can be least significant in this manner, the unevenness in color in the color image becomes hardly noticeable. It is thus possible to further reduce the unevenness in color in the color image resulting from the folding of the light beams.

An image forming apparatus according to still another aspect of the invention includes the optical scanning device described above, and plural photoconductors corresponding to the images using the developing agents each having different brightness.

According to the configuration as above, by using the optical scanning device described above in a color image forming apparatus, the unevenness in color in the color image resulting from the folding of the light beam becomes hardly noticeable.

This application is based on patent application No. 2006-014766 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical scanning device, comprising:
    plural light sources that emit light beams corresponding to images using developing agents each having different brightness;
    a deflector that deflects plural light beams emitted from the plural light sources as the plural light beams go incident on a same reflection surface thereof at different angles of incidence in a sub-scanning direction; and
    plural reflection members that reflect the plural light beams deflected by the deflector to be distributed to surfaces of different photoconductors,
    wherein, of light paths of the plural light beams, a number of the reflection members that are disposed in a light path of a light beam corresponding to an image using a developing agent having highest brightness is larger than the numbers of the reflection members that are disposed in light paths of the light beams corresponding to images using the other developing agents,
    wherein the plural light sources include:
    a first light source that emits a first light beam corresponding to an image using a cyan developing agent;
    a second light source that emits a second light beam corresponding to an image using a magenta developing agent;
    a third light source that emits a third light beam corresponding to an image using a yellow developing agent; and
    a fourth light source that emits a fourth light beam corresponding to an image using a black developing agent,
    wherein the reflection members include:
    at least one first folding mirror that reflects only the first light beam;
    at least one second folding mirror that reflects only the second light beam;
    at least one third folding mirror that reflects only the third light beam; and
    at least one fourth folding mirror that reflects only the fourth light beam;
    wherein the at least one third folding mirror comprises more of the reflection members than the number of the reflection members that comprise the at least one first folding mirror, the number of the reflection members that comprise the at least one second folding mirror and the number of the reflection members that comprise the at least one fourth folding mirror, and
    wherein the third folding mirror reflects the third light beam so that a difference in light beam intensity between the center portion and the end portion of the image height of the third light beam is larger than a difference in light beam intensity between the center portion and the end portion of each image height of the first, second and fourth light beams.

2. An image forming apparatus, comprising:
    the optical scanning device set forth in claim 1; and
    plural photoconductors corresponding to the images using the developing agents each having different brightness.

3. The optical scanning device according to claim 1, wherein:
    of the light paths of the plural light beams, a number of the reflection members that are disposed in a light path of a light beam corresponding to an image using a developing agent having lowest brightness is smaller than the numbers of the reflection members that are disposed in light paths of the light beams corresponding to images using the other developing agents.

4. The optical scanning device according to claim 3, wherein:
    the number of the reflection members that reflect the fourth light beam deflected by the deflector is smaller than the numbers of the reflection members that reflect the first through third light beams deflected by the deflector.

5. The optical scanning device according to claim 4, wherein the plural reflection members include:
    a first reflection member that reflects the first light beam deflected by the deflector;
    a second reflection member that guides the first light beam reflected on the first reflection member to a surface of a photoconductor for cyan;
    a third reflection member that reflects the second light beam deflected by the deflector;
    a fourth reflection member that guides the second light beam reflected on the third reflection member to a surface of a photoconductor for magenta;
    a fifth reflection member that reflects the third light beam deflected by the deflector;
    a sixth reflection member that reflects the third light beam reflected on the fifth reflection member;
    a seventh reflection member that guides the third light beam reflected on the sixth reflection member to a surface of a photoconductor for yellow; and
    an eighth reflection member that guides the fourth light beam deflected by the deflector to a surface of a photoconductor for black.

6. The optical scanning device according to claim 5, wherein:
    the second, fourth, seventh, and eighth reflection members are disposed sequentially along the sub-scanning direction.

7. An optical scanning device, comprising:
    plural light sources that emit light beams corresponding to images using developing agents each having different brightness;
    a deflector that deflects plural light beams emitted from the plural light sources as the plural light beams go incident on a same reflection surface thereof at different angles of incidence in a sub-scanning direction; and
    plural reflection members that reflect the plural light beams deflected by the deflector to be distributed to surfaces of different photoconductors,
    wherein, of light paths of the plural light beams, a number of the reflection members that are disposed in a light path of a light beam corresponding to an image using a developing agent having lowest brightness is smaller than the numbers of the reflection members that are disposed in light paths of the light beams corresponding to images using the other developing agents,
    wherein the plural light sources include:
    a first light source that emits a first light beam corresponding to an image using a cyan developing agent;

a second light source that emits a second light beam corresponding to an image using a magenta developing agent;

a third light source that emits a third light beam corresponding to an image using a yellow developing agent; and a fourth light source that emits a fourth light beam corresponding to an image using a black developing agent, and wherein the reflection members include:

at least one first folding mirror that reflects only the first light beam;

at least one second folding mirror that reflects only the second light beam;

at least one third folding mirror that reflects only the third light beam; and at least one fourth folding mirror that reflects only the fourth light beam;

wherein the at least one fourth folding mirror comprises fewer of the reflection members than the number of the reflection members that comprise the at least one first folding mirror, the number of the reflection members that comprise the at least one second folding mirror and the number of the reflection members that comprise the at least one third folding mirror, and the fourth folding mirror reflects the fourth light beam so that a difference in light beam intensity between the center portion and the end portion of the image height of the fourth light beam is smaller than a difference in light beam intensity between the center portion and the end portion of each image height of the first, second and third light beams.

8. An image forming apparatus, comprising:

the optical scanning device set forth in claim 7; and plural photoconductors corresponding to the images using the developing agents each having different brightness.

9. An optical scanning device, comprising:

plural light sources that emit light beams corresponding to images using developing agents each having different brightness;

a deflector that deflects plural light beams emitted from the plural light sources as the plural light beams go incident on a same reflection surface thereof at different angles of incidence in a sub-scanning direction; and plural reflection members that reflect the plural light beams deflected by the deflector to be distributed to surfaces of different photoconductors, wherein, of light paths of the plural light beams, a number of the reflection members that are disposed in a light path of a light beam corresponding to an image using a developing agent having highest brightness is larger than the numbers of the reflection members that are disposed in light paths of the light beams corresponding to images using the other developing agents, wherein the plural light sources include:

a first light source that emits a first light beam corresponding to an image using a cyan developing agent;

a second light source that emits a second light beam corresponding to an image using a magenta developing agent;

a third light source that emits a third light beam corresponding to an image using a yellow developing agent; and a fourth light source that emits a fourth light beam corresponding to an image using a black developing agent, wherein the reflection members include:

a first folding mirror array that reflects only the first light beam;

a second folding mirror array that reflects only the second light beam;

a third folding mirror array that reflects only the third light beam; and a fourth folding mirror array that reflects only the fourth light beam;

wherein the third folding mirror array comprises more of the reflection members than any one of the first folding mirror array, the second folding mirror array and the fourth folding mirror array, and wherein the third folding mirror array reflects the third light beam so that a difference in light beam intensity between the center portion and the end portion of the image height of the third light beam is larger than a difference in light beam intensity between the center portion and the end portion of each image height of the first, second and fourth light beams.

* * * * *